United States Patent [19]

Sakurai et al.

[11] Patent Number: 4,653,689
[45] Date of Patent: Mar. 31, 1987

[54] VEHICLE AIR CONDITIONER HAVING LOST MOTION COUPLING BETWEEN THE AIR-MIX DOOR AND THE WATER COCK

[75] Inventors: Yukio Sakurai; Koichi Doi, both of Atsugi, Japan

[73] Assignee: Nissan Motor Co., Ltd., Yokohama, Japan

[21] Appl. No.: 719,440

[22] Filed: Apr. 3, 1985

[30] Foreign Application Priority Data

Apr. 10, 1984 [JP] Japan .................... 59-70155

[51] Int. Cl.[4] .............................. B60H 1/02
[52] U.S. Cl. ................. 237/12.3 B; 237/12.3 A; 98/2.05; 165/42; 236/13
[58] Field of Search .............. 237/12.3 B, 12.3 A, 237/2 A; 236/13; 98/2.05, 2.06, 2.08, 2.11; 165/42, 43; 137/625.11

[56] References Cited

U.S. PATENT DOCUMENTS

| | | | |
|---|---|---|---|
| 2,742,844 | 4/1956 | Steadman | 237/12.3 A |
| 2,800,068 | 7/1957 | Arnold et al. | 237/12.3 B |
| 2,832,277 | 4/1958 | Simons et al. | 98/2.06 |
| 3,072,339 | 1/1963 | Lambum et al. | 237/12.3 A |
| 3,693,532 | 9/1972 | Colinet et al. | 98/2.08 |
| 3,913,834 | 10/1975 | Supper | 237/12.3 A |
| 4,083,290 | 4/1978 | Andres | 137/625.11 |
| 4,355,752 | 10/1982 | Antoine | 165/43 |
| 4,420,115 | 12/1983 | Matsushima et al. | 236/13 |
| 4,537,114 | 8/1985 | Izaki | 98/2.05 |

FOREIGN PATENT DOCUMENTS

| | | | |
|---|---|---|---|
| 215337 | 4/1957 | Australia | 237/12.3 B |
| 2330555 | 7/1977 | France | 237/12.3 A |
| 0123515 | 9/1980 | Japan | 165/43 |
| 0123520 | 9/1980 | Japan | 165/43 |
| 738865 | 10/1955 | United Kingdom | 237/12.3 B |

*Primary Examiner*—William R. Cline
*Assistant Examiner*—John K. Ford
*Attorney, Agent, or Firm*—Leydig, Voit & Mayer

[57] ABSTRACT

A vehicle air conditioner is provided with a "lost motion" mechanism for drivingly connecting first and second shafts with one common actuator such that an air-mix door and a water cock are driven by the one common actuator.

9 Claims, 5 Drawing Figures

| PIVOTAL END OF PLUNGER (27a) | a | b | c | d | e | f | g | h |
|---|---|---|---|---|---|---|---|---|
| 2ND GUIDE PIN (33) | 1a | 1b | 1c | 1d | 1e | 1f | 1g | 1h |
| AIR-MIX DOOR (22) | 2b | 2b | 2c | 2d | 2e | 2f | 2g | 2h |
| WATER COCK (39) | CLO-SED | OPEN | " | " | " | " | " | " |

VEHICLE AIR CONDITIONER HAVING LOST MOTION COUPLING BETWEEN THE AIR-MIX DOOR AND THE WATER COCK

BACKGROUND OF THE INVENTION

1. Field of the Invention

The present invention relates to vehicle air conditioners.

2. Description of the Prior Art

FIG. 1 shows an air conditioning system widely used in modern automotive vehicles. In the figure, the reference numeral 1 indicates a case forming therein an air flow passage 2. The case 1 is formed at an end thereof with an inlet 3 and at the other end thereof with a defroster outlet 4, ventilator outlet 5 and floor outlet 6. Within the air flow passage 2 there are disposed a blower 7 and an evaporator 8 and further disposed downward thereof a heater core 9 for action as a heat exchanger and an air-mix door 10 for controlling air flow through the heater core 9 and thereby controlling the temperature of air blown from the above mentioned outlets 4, 5 and 6. The air-mix door 10 is turned in the direction "A" when the above mentioned temperature is desired low and in the direction "C" when the temperature is desired high and is placed adjacent the position "B" when the temperature is desired moderate.

The heater core 9 and the air-mix door 10 are controlled by a drive mechanism as shown in FIG. 2. In the figure, the reference numeral 11 indicates a shaft which is rotatable together with the air-mix door 10. An end of the shaft 11 is connected through a link 12 to an actuator 13 whose operation is controlled by a solenoid valve 14. The heater core 9 is communicated with a water jacket of an internal combustion engine, not shown, through an inlet pipe 15a and outlet pipe 15b. The inlet pipe 15a has disposed therein a water cock 16 for controlling the flow rate of engine coolant supplied therethrough to the heater core 9. To this end, the water cock 16 is operatively connected through a link 17 to an actuator 18 whose operation is controlled by a solenoid valve 19. The temperature blown from the outlets 4, 5 and 6 is thus adjusted to a set value by controlling the air-mix door 10 and the water cock 16 through operation of the actuators 13 and 18 in accordance with the set temperature.

With the prior art arrangement, two actuators 13 and 18 are required for independently controlling the air-mix door 10 and the water cock 16. Due to this, adjustment of the actuators 13 and 18 is necessitated after their installation for timing their operations to each other for thereby timing the operations of the air-mix door 10 and the water cock 16 to each other, resulting in a necessity of a difficult and time-consuming adjusting work.

Further, with the above prior art arrangement, a plurality of actuators 13 and 18 and a plurality of solenoids 14 and 19 are indispensable, resulting in an expensive manufacturing and assembly cost, a necessity of a wide space for arrangement of such parts and a possibility of providing an increased limitation to the design of the associated parts.

SUMMARY OF THE INVENTION

In accordance with the present invention, there is provided an improved air conditioner. The air conditioner comprises a heater core, a water cock having a rotatable member for controlling flow of heating medium to be supplied therethrough to the heater core, an air-mix door swingable to control flow of air through the heater core, a first shaft rotatable to drive the air-mix door and an actuator having a stepwisely reciprocative plunger. The above structure may follow the conventional fashion.

In accordance with the present invention, there is provided a second shaft rotatable to drive the rotatable member of the water cock and link means for drivingly connecting the first and second shafts with the above mentioned one common plunger.

The above structure does not require two actuators but one and makes it easier to set a predetermined timed relation in operation between the air-mix door and the water cock. Further, it is superior in space and cost to the comparable prior art structure.

It is accordingly an object of the present invention to provide a vehicle air conditioner which makes it easier to set a timed relation in operation between an air-mix door and a water cock thereof.

It is another object of the present invention to provide a vehicle air conditioner of the aforementioned character which can reduce the number of actuators for driving the air-mix door and the water cock.

It is a further object of the present invention to provide a vehicle air conditioner of the above mentioned character which requires a less space for its installation and therefore can be compact in size.

It is a further object of the present invention to provide a vehicle air conditioner of the above mentioned character which can reduce the limitation to the design of parts associated with a drive mechanism for driving the air-mix and the water cock.

It is a yet further object of the present invention to provide a vehicle air conditioner of the above mentioned character which can reduce the manufacturing and assembling cost.

BRIEF DESCRIPTION OF THE DRAWINGS

The features and advantages of the vehicle air conditioner according to the present invention will become more clearly appreciated from the following description taken in conjunction with the accompanying drawings, in which.

DETAILED DESCRIPTION OF THE PREFERRED EMBODIMENT

Figure 1:
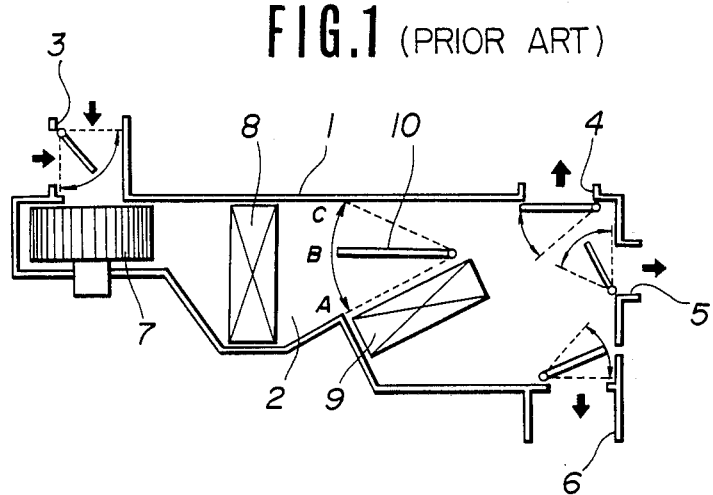
FIG. 1 is a schematic view of a prior art vehicle air conditioner.
Figure 2:
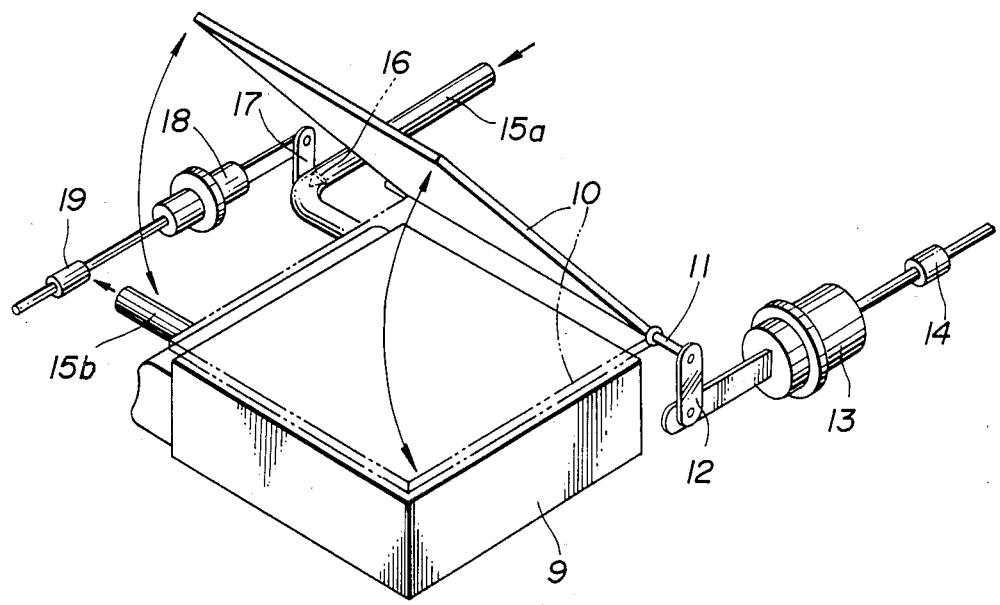
FIG. 2 is an enlarged perspective view of a portion of the prior art air conditioner of FIG. 1.
Figures 3, 5:
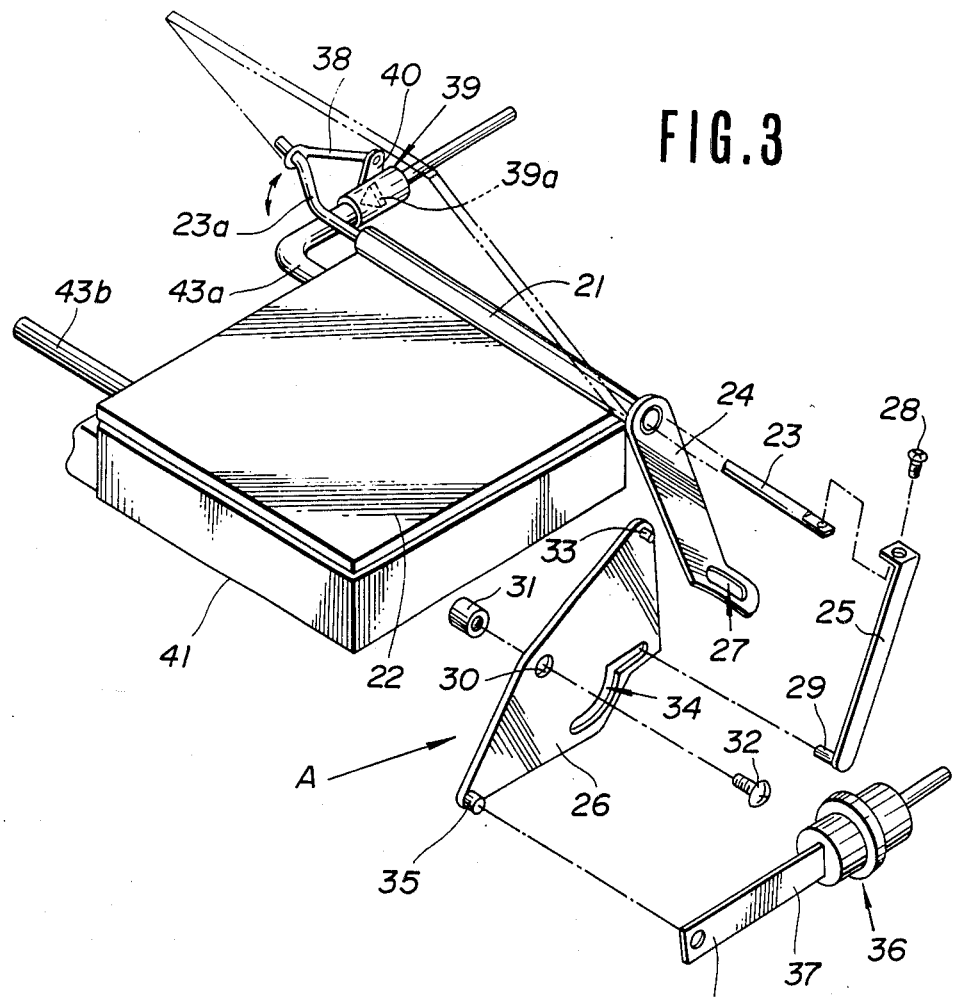
FIG. 3 is an exploded view of a novel important portion of a vehicle air conditioner of the present invention, which portion corresponds to the portion of FIG. 2.
FIG. 5 is a table showing various positions to which some movable portions of the air conditioner of FIGS. 3 and 4 are put in response to various set temperatures.
Figure 4:
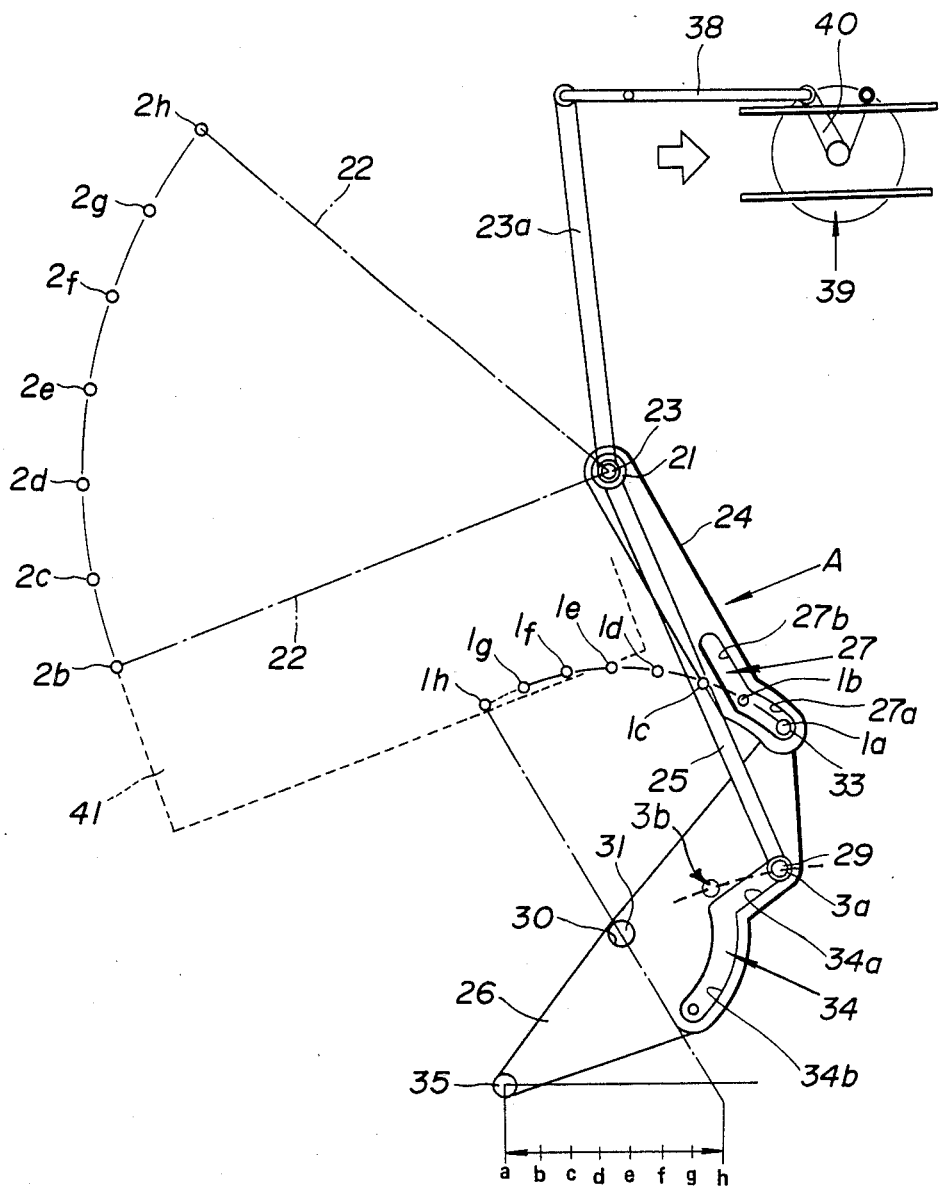
FIG. 4 is an enlarged side elevation of some parts of the air conditioner of FIG. 3.

Referring to FIGS. 3 to 5, inclusive, in which omitted parts and portions are similar to those of the prior art air conditioner of FIG. 1, a vehicle air conditioner of the present invention comprises a first shaft 21 which is rotatable together with an air-mix door 22. The first shaft 21 is hollow throughout the length thereof to rotatably receive therein a second shaft 23 for controlling the operation of a water cock 39. One end of the first and second shafts 21 and 23 is operatively connected to a common actuator 36 through a link mechanism "A". The link mechanism "A" consists of a first link 24, second link 25 and side link 26. The first link 24 is in the form of an elongated bar and fixedly attached at an end thereof to the first shaft 21. The first link 24 has at the other end thereof a first guide slot 27. The second link 25 is in the form of an elongated bar and screwed 28 or otherwise secured at an end thereof to the second shaft 23. The second link 25 has at the other end thereof a first guide pin 29. The side link 26 is in the form of a bell crank and has at a location intermediate between the opposite ends thereof a circular hole 30 at which it is rotatably mounted on a first pivot 31. The first pivot 31 is in turn secured to a case 1 (refer to FIG. 1). The side link 26 is prevented from slipping off from the first pivot 31 by a screw 32 attached through the opening 30 to the pivot 31. The side link 26 has at an end thereof a second pivot 33 which is movably disposed in the first guide slot 27 and also has at a location intermediate between the opposite ends thereof a second guide slot 34 in which the first guide pin 29 is movably disposed.

The first and second guide slots 27 and 34 are so shaped as best shown in FIG. 4, that is, the first guide slot 27 consists of an air-mix door stationarily holding guide slot section 27a and an air-mix door driving guide slot section 27b. The guide slot section 27a is located nearer to the aforementioned other end of the first link 24 and is formed into such an arcuate shape as to constitute a segment of an arc of a circle whose center coincides with the center axis of the first pivot 31. The arcuate guide slot section 27a terminates in the guide slot section 27b at an end nearer to the aforementioned one end of the first link 24. The guide slot section 27b is formed into a straight shape and extends longitudinally away from the arcuate guide slot section 27a toward the aforementioned one end of the first link 24. The second guide slot 34 consists of a water cock driving guide slot section 34a and a water cock stationarily holding guide slot section 34b. The guide slot section 34a is formed into a straight shape and located nearer to the second guide pin 33. The guide slot section 34a terminates in the guide slot section 34b at an end remoter from the second guide pin 33. The guide slot section 34b is formed into such an arcuate shape as to constitute a segment of an arc of a circle whose center coincides with the axis of the first pivot 31. The arc length of the air-mix door stationarily holding guide slot section 27a is designed so that in response to rotation of the side link 26 causing the first guide pin 29 to shift from the position "3a" to the position "3b" in FIG. 4, the second guide pin 33 shifts from the position "1a" to the position "1b" in FIG. 4. Similarly, the arc length of the water cock stationarily holding guide slot section 34b is designed so as to stationarily hold the first guide pin 29 at the position "3b" during shifting of the second guide pin 33 from the position "1b" to the position "1h" in FIG. 4, being guided by the air-mix door driving guide slot section 27b.

The side link 26 has at the other end thereof a second pivot 35 and is pivotally connected at the second pivot 35 to a corresponding pivotal end 37a of a plunger 37 of the actuator 36. The actuator 36 is constructed so that the plunger 37 is movable stepwisely, e.g. eight steps, whereby to stepwisely rotate the side link 26 about the first pivot 31.

The other end 23a of the second shaft 23 projects outwardly from the first shaft 21 and is formed into a crank-like shape for connection to an end of a third link 38 in such a manner that the third link 38 is movable longitudinally thereof in response to rotation of the second shaft 23. The other end of the third link 38 is connected to an arm 40 of the water cock 39 in such a manner that the arm 40 is swingable or turnable in response to longitudinal movement of the third link 38.

The air-mix door 21 is constructed similarly to the conventional and regulates air flow through a heater core 41 which is adapted for action as a heat exchanger for thereby controlling the temperature of air blown from the outlets 4, 5 and 6 of the air conditioner (refer to FIG. 1). On the other hand, the water cock 39 is also constructed similarly to the conventional and has a rotatable member 39a which is disposed in an inlet pipe 43a of the heater core 41. The rotatable member 39a is connected to the arm 40 and rotatable in response to swinging of same for regulating the flow rate of heating medium or engine coolant supplied therethrough to the heater core 41. The reference numeral 43b indicates an outlet pipe of the heater core 41.

The vehicle air conditioner thus far described according to the present invention operates as follows:

When it is desired that outside air is first cooled by a cooling unit constituted by the evaporator 8 (refer to FIG. 1), etc. and then blown from the outlets 4, 5 and 6 (refer to FIG. 1), i.e., upon cooling, the actuator 36 is not put into action and allowed to hold the pivotal end 37a of the plunger 37 at its most protruded position, thus holding the side link 26 stationarily at the position illustrated in FIG. 4. When this is the case, the water cock 39 is closed while the air-mix door 22 is held at the "COLD" position as indicated by "2b" in FIG. 4, allowing cold air having been cooled by the cooling unit to be blown into the interior of the vehicle without being heated by the heater core 41.

When the temperature in the interior of the vehicle is lower than a set temperature, the actuator 36 is put into action by means of a control unit, not shown, to hold the pivotal end 37a of the plunger 37 at its certain retracted position. Due to this, the second pivot 35 is pulled by the plunger 37 to rotate the side link 26 about the first pivot 31, thus causing the water cock 39 to open to allow engine coolant to be supplied therethrough to the heater core 41 while holding the air-mix door 22 at its certain open position in accordance with the difference between the temperature in the interior of the vehicle and the set temperature. Accordingly, part of air having been cooled by the cooling system is forced to flow through the heater core 41 to be heated thereby so that air heated up to the set temperature is blown into the interior of the vehicle.

In the above, during shifting of the second guide pin 33 from the position "1a" to the position "1b" in FIG. 4 due to rotation of the side link 26, the first link 24 is held stationarily at the position illustrated in FIG. 4 by the lost motion effect of the air-mix door stationarily holding arcuate guide slot section 27a, thus holding the air-mix door 22 at the "COLD" position "2b" (refer to FIG. 5). During this period of lost motion when the first link 24 and air-mix door is held stationary, the first guide pin 29 shifts from the position "3a" to the position "3b" in FIG. 4, causing, through the operations of the second link 25, second shaft 23, third link 38 and arm 40, the water cock 39 to shift from a fully closed position to a fully open position. By this, engine coolant is introduced into the heater core 41 prior to shifting of the air-mix door 22 out of the "COLD" position "2b". From this time onward, when the actuator 36 is operated to cause the pivotal end 37a of the plunger 37 to assume the position "d" in FIG. 4 in accordance with a set temperature, the second guide pin 33 is caused to shift to the position "1d" in FIG. 4. In response to this, the first link 24 is caused to rotate by the effect of the air-mix door driving guide slot section 27b, causing the first shaft 21 and therefore the air-mix door 22 to rotatably shift to the position "2d" which is located nearer to the "HOT" position "2h" as compared with the "COLD" position "2b". By this, air blown from the air conditioner is heated up to the set temperature. In this connection, it is to be noted that temperature variation of air blown from the air conditioner becomes stable since the water cock 39 is fully opened prior to shifting of the air-mix door 22 out of the "COLD" position "2b" or toward the "HOT" position "2h". The actuator 36 causes, in accordance with various set temperatures, the pivotal end 37a of the plunger 37 to assume various positions as indicated by "a" to "h" in FIG. 4, and in response to the positions into which the pivotal end 37a of the plunger 37 is put, the side link 26, air-mix door 22 and water cock 39 respectively assume various positions as shown in the table of FIG. 5. Since the table of FIG. 5 is self-explanatory, further description thereto is omitted.

While one preferred embodiment has been described and shown in the above, the present invention is not limited to it. For example, the first and second shafts 21 and 23 may be arranged at a place spaced from the air-mix door 22, and some link members may be employed for transmitting rotations of the first and second shafts 21 and 23 to the air-mix door 22 and the water cock 39.

What is claimed is:

1. A vehicle air conditioner comprising:
    a heater core;
    means including a water cock having a rotatable member movable from a closed to an open position for controlling flow of heating medium to be supplied therethrough to said heater core;
    means to control flow of air through said heater core including an air-mix door swingable from a closed position in which cool air is supplied to a passenger compartment to an open position in which exclusively heated air is supplied to said passenger compartment;
    means for driving said air-mix door including a first rotatable shaft;
    means for driving said rotatable member of said water cock including a second shaft coupled to said rotatable member for rotation independently of said first shaft; and
    common power actuated means for actuating both said shafts including an actuator having a common stepwisely reciprocative plunger, and link means including a lost motion connection for drivingly connecting said first and second shafts with said common plunger so as to hold said air-mix door closed while said water cock is shifted from closed to open position upon a step movement of said plunger.

2. A vehicle air conditioner as set forth in claim 1, in which said first shaft is hollow throughout the length thereof to receive said second shaft for independent rotation.

3. A vehicle air conditioner as set forth in claim 2, in which said first shaft is fixedly attached to said air-mix door to rotate together therewith.

4. A vehicle air conditioner as set forth in claim 3, in which said link means comprises a first link fixedly attached at an end thereof to said first shaft and having a first guide slot at the other end thereof, a second link fixedly attached at an end thereof to said second shaft and having a first guide pin at the other end thereof, and a side link pivotally installed to have a pivotal axis at a location intermediate between the opposite ends thereof and having at one of said ends thereof a second guide pin movably received in said first guide slot, said side link being pivotally connected at the other of said ends thereof to said plunger and formed at a location adjacent said pivotal axis thereof with a second guide slot in which said first guide pin is movably received, said first and second guide slots in said links providing said lost motion connection.

5. A vehicle air conditioner as set forth in claim 4, in which said lost motion connection providing first guide slot includes an air-mix door holding guide slot section for holding said first link stationary when said second guide pin moves in said air-mix door holding guide slot section and an air-mix door driving guide slot section for causing said first link to swing when said second guide pin moves in said air-mix door driving guide slot section, said air-mix door holding guide slot section being formed into a segment of an arc of a circle with a center which coincides with said pivotal axis of said side link, said air-mix door holding guide slot section terminating in said air-mix door driving guide slot section at an end thereof nearer to said one end of said first link, said air-mix door driving guide slot section being formed into a straight shape and extending longitudinally away from said air-mix door holding guide slot section toward said one end of said first link.

6. A vehicle air conditioner as set forth in claim 5, in which said lost motion connection providing second guide slot includes a water cock driving guide slot section for causing said second link to swing when said first guide pin moves in said water cock driving guide slot section and a water cock holding guide slot section for holding said second link stationary when said first guide pin moves in said water cock holding guide slot section, said water cock driving guide slot section being formed into a straight shape and located nearer to said second guide pin, said water cock driving guide slot section terminating in said water cock holding guide slot section at an end further from said second guide pin, said water cock holding guide slot section being formed into a segment of an arc of a circle with a center which coincides with said pivotal axis of said side link.

7. A vehicle air conditioned as set forth in claim 6, in which said lost motion connection providing air-mix door holding guide slot section is of such a length that in response to rotation of said side link causing said first guide pin to shift from one end of said water cock driving guide slot section to the other end of same, said second guide pin shifts from one end of said air-mix door holding guide slot section to the other end of same.

8. A vehicle air conditioner as set forth in claim 7, in which said lost motion connection providing water cock holding guide slot section is of such a length as to hold therewithin said first guide pin during shifting of said second guide pin from one end of said air-mix door driving guide slot section to the other end of same.

9. A vehicle air conditioner as set forth in claim 7, in which said second shaft has an end portion formed into a crank-like shape, said rotatable member of said water cock being connected to a swingable arm which in turn is connected through a reciprocative third link to said crank-shaped end of said second shaft.

* * * * *